US006178871B1

(12) United States Patent
Sutherland

(10) Patent No.: US 6,178,871 B1
(45) Date of Patent: Jan. 30, 2001

(54) ACTUATOR AND METHOD OF OPERATING SAME

(76) Inventor: Tom Sutherland, Box 442, Fraser Lake, British Columbia (CA), V0J 1S0

( * ) Notice: Under 35 U.S.C. 154(b), the term of this patent shall be extended for 0 days.

(21) Appl. No.: 09/104,418

(22) Filed: Jun. 25, 1998

(51) Int. Cl.[7] ........................................................ F16J 3/04
(52) U.S. Cl. ...................................... 92/39; 92/93; 91/275
(58) Field of Search .................................... 92/37, 39, 93; 91/330, 275

(56) References Cited

U.S. PATENT DOCUMENTS

| | | | | |
|---|---|---|---|---|
| 4,666,073 | * | 5/1987 | DuFour | 226/23 |
| 5,072,584 | * | 12/1991 | Mauch et al. | 60/378 |

FOREIGN PATENT DOCUMENTS

| | | |
|---|---|---|
| 1101778 | 5/1981 | (CA) . |
| 1133359 | 10/1982 | (CA) . |
| 1281747 | 3/1991 | (CA) . |
| 1320980 | 8/1993 | (CA) . |

* cited by examiner

*Primary Examiner*—Edward K. Look
*Assistant Examiner*—Thomas E. Lazo
(74) *Attorney, Agent, or Firm*—John Russell Uren

(57) ABSTRACT

Actuator (140) for providing intermittent movement to a member (151). The actuator (140) has actuator cushion members (150) which extend with the entry of air and which contract with the egress of air provided through air supply lines (151, 152) connected to the actuator through a valve (172). The member (161) moved by the actuator cushion members (150) is located between the actuator cushion members (150). As one actuator cushion member (150) fills with air, force is applied to the member (161) thereby to provide movement force. Simultaneously, air exits from the opposite actuator cushion member (150) allowing the movement of the member to proceed. A control system (161) provides the cycle and frequency of the air application to the actuator (140).

23 Claims, 6 Drawing Sheets

ACTUATOR AND METHOD OF OPERATING SAME

INTRODUCTION

This invention relates to an actuator and, more particularly, to an actuator which initiates and maintains reciprocal movement of a bellcrank by the use of expandable and retractable actuator cushion members.

BACKGROUND OF THE INVENTION

Actuators are used in many different applications and particularly in manufacturing operations using machinery. Such actuators generally provide a reciprocal movement to a member such as a bellcrank mounted to a shaft, which shaft the bellcrank rotates under the influence of the actuator.

In lumber mills, for example, board retaining devices are used to restrain the cut boards in position on a table on which the boards are being moved by a conveyor. An actuator provides for the release of the restrained boards for further processing and such movement is performed periodically. As a bellcrank rotates under the influence of the actuator, the board retainer moves between two positions, the first position restraining the conveyed boards and the second position where the restrained boards are released. Many other applications use reciprocal movement of members and actuators are used to provide such reciprocal movement in many instances.

Heretofore, the bellcranks being rotated by the action of the actuator extended from a shaft and were fitted within a clevis which formed one end of a piston movable by a hydraulic or pneumatic cylinder. Air was pumped into the cylinder which would then extend or retract the piston. This rotated the bellcrank and the shaft to which the bellcrank was attached. The pneumatic cylinder was mounted for limited rotational movement on a base.

There are, however, numerous problems with present actuators and the operation of such actuators. First, the movement of the piston due to the ingress and egress of air in the pneumatic cylinder is not smooth. Rather, the piston quickly moves under the incoming influence of the air and stopping force is provided by contact between the piston and the cylinder when the end position of piston travel has been reached. This impact force at the end of piston travel results in wear and damage and early breakdown of components. Second, it is important that the shaft to which the bellcrank is mounted moves a predetermined amount in a fairly precise movement range. This is so because the position of the members controlled by the rotation of the shaft is determined by the movement of the bellcrank under the influence of the actuator. Thus, the tolerances between movement of the piston and the bellcrank are relatively close. Shock or impact loading as is obtained with the present actuator results in the tolerances being lost over time and these tolerances must be manually reset often. This results in inefficient and increased manpower requirements. Third, when the machinery is initially set up or if actuators are replaced, the tolerances must be manually reset. This setup is also time consuming and labor intensive.

SUMMARY OF THE INVENTION

According to one aspect of the invention, there is provided an actuator for initiating movement of a member, said actuator comprising a frame and at least one flexible and expandable actuator cushion member mounted on one side of said frame and being operable to move said member.

According to a further aspect of the invention, there is provided a control unit for an actuator, said control unit having a first component to adjust the frequency of movement of said actuator and a second component to adjust the cycle length of said movement of said actuator.

According to yet a further aspect of the invention, there is provided a method of initiating movement of a member comprising locating an actuator cushion member in operable relationship with said member and expanding and contracting said actuator cushion member to move said member.

According to still yet a further aspect of the invention, there is provided a method of controlling an actuator comprising adjusting the frequency of operation of a cushion member in operable contact with a movable member with a first component and adjusting the length of the cycle of said operation of said cushion member with a second component.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
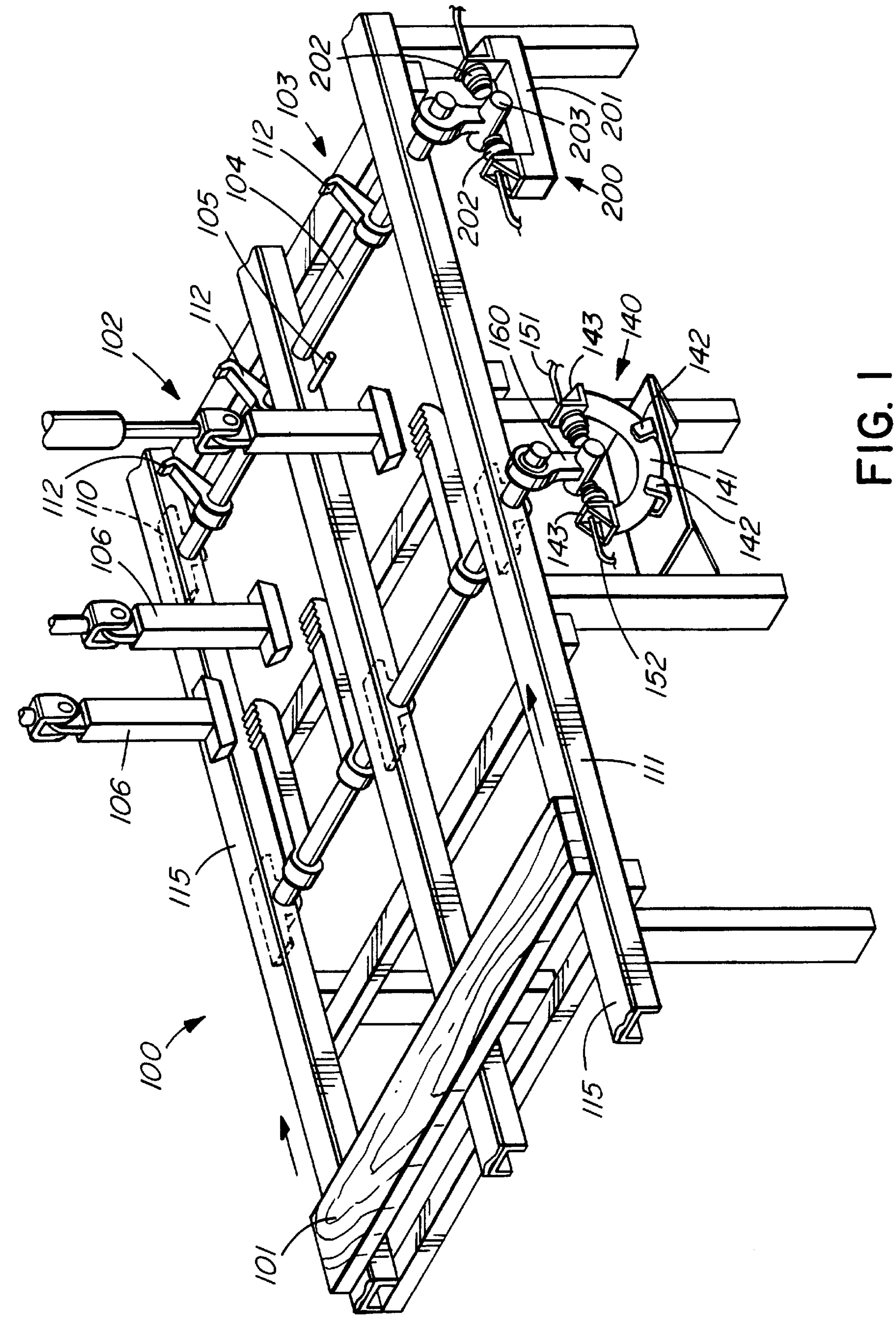
FIG. 1 is a diagrammatic isometric view of two(2) actuators according to the invention, one located on and being operably related to a board clamp and the other being operably connected with a board stop, each being a part of a lug loader used for cut lumber.

With reference now to the drawings, a typical lug loader is generally illustrated at 100 in FIG. 1 which lug loader 100 is used in lumber mills. The lug loader 100 has a flow of cut boards 101 moving in the direction indicated under the influence of a conveyor 115 towards a board clamp generally illustrated at 102 and a board stop generally illustrated at 103. A proximity switch in the form of an electric eye 105 indicated the presence or absence of lumber on the lug loader 100 and board clamps 106 are used to retain or release the lumber at appropriate intervals.

Board stop 103 includes a shaft 104 rotatable in bearings 110 which bearings 110 are mounted on the frame 111 of the lug loader 100. A series of bellcranks 112 (FIG. 3) are mounted in a fixed position relative to shaft 104 and rotate with shaft 104 when shaft 104 rotates as will be described in greater detail.

An extension member 113 is further mounted to the shaft 104 and extends outwardly therefrom. Extension member 113 is connected to a clevis 114 formed in the end of piston 120. Piston 120 extends from two-way cylinder 121, cylinder 121 being conveniently actuated pneumatically or hydraulically. If pneumatic, air supply lines 122, 123 are connected to cylinder 121 and provide the air pressure required by the cylinder 121 to extend and retract piston 120. A clevis 124 extends from the opposite end of cylinder 121 from piston 120 and in joined to a quadrant 130 welded to a mounting plate 131 connected to a rubber or elastomer material 132. The elastomer material 132 is connected to a second mounting plate 133 which, in turn, is connected to a mount 134 properly located. It will be appreciated that the combination of mounting plate 131, clevis 124, cylinder 121, piston 120 and clevis 114 is prior art and in use at the present time.

Figure 2:
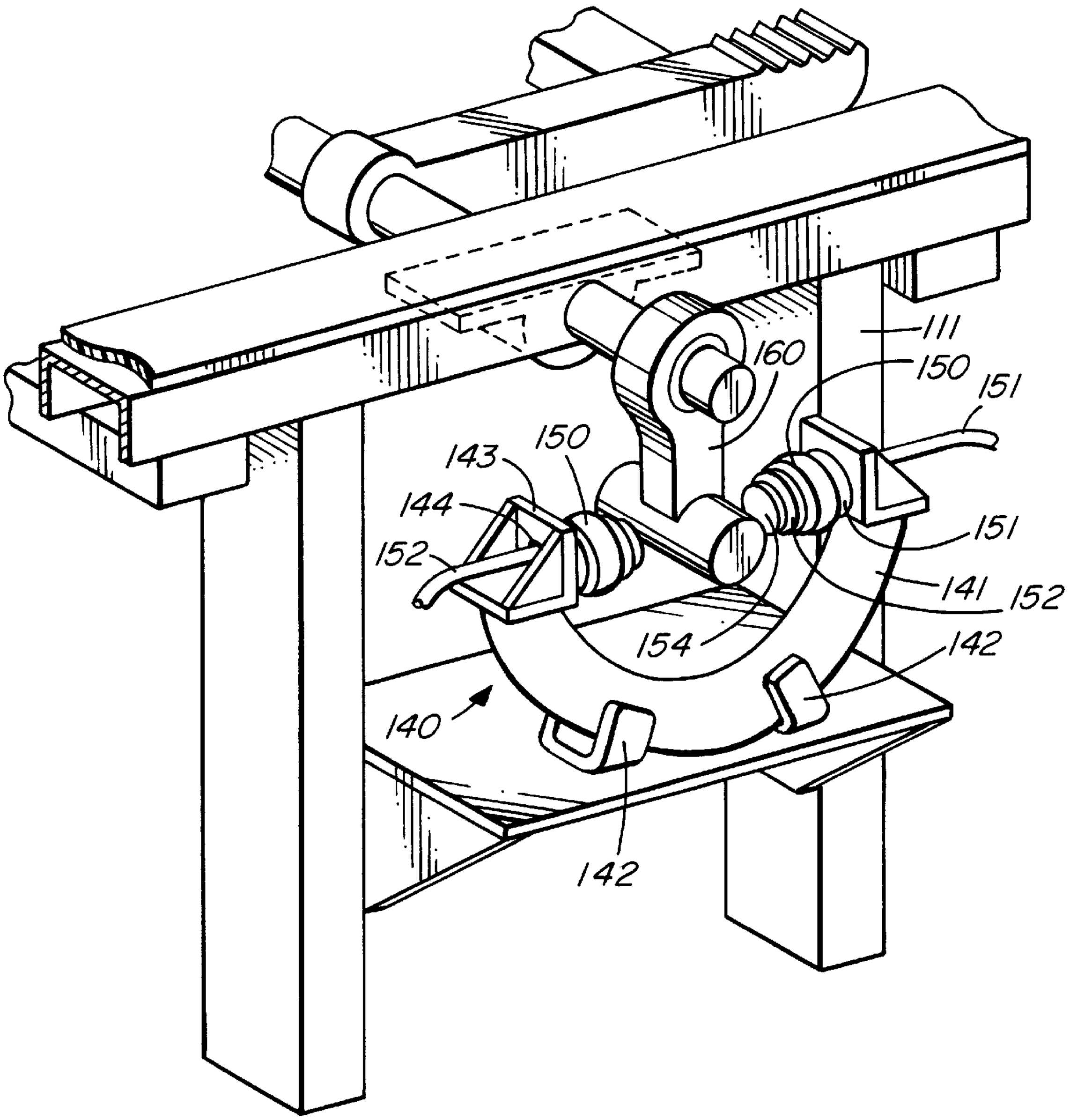
FIG. 2 is a diagrammatic isometric view of the actuator according to the invention similar to FIG. 1 but particularly illustrating the mounting of the actuator on a frame connected to the lug loader.

The actuator according to the invention is generally illustrated at 140. Actuator 140 includes a frame 141 which is connected to frame 111 of the lug loader 100 using base mounts 142 (FIG. 2) which extend between the frame 141 of the actuator 140 and the frame 111 of the lug loader 100. The frame 141 terminates in two L-type members 143 which are each welded to the ends of frame 141.

L-members 143 each have a central hole 144 to allow the insertion of appropriate fittings allowing air to be supplied to the actuator cushion members 150 from air supply lines 151, 152 as will be described.

Figure 3:
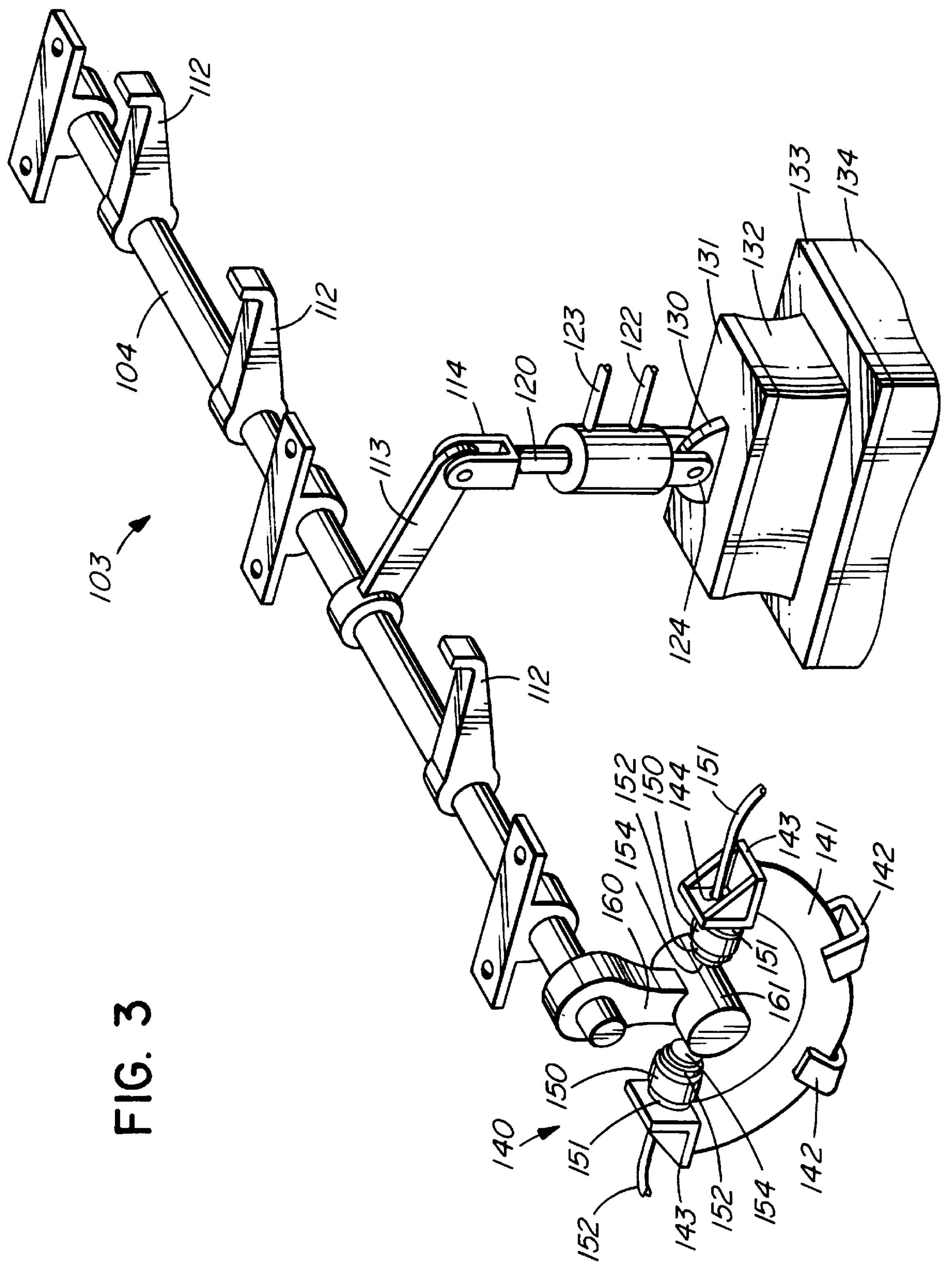
FIG. 3 is a diagrammatic isometric view of an actuator according to one aspect of the invention and further illustrating a typical actuator according to the prior art, both actuators being operably connected to a lug loader used in lumber mills.

The actuator cushion members 150 are each mounted between circular steel members 151, 152 (FIG. 3). Steel members 151 are mounted directly to the L-members 143 using bolts (not shown), for example, and retain each of the actuator cushion members 150. Steel members 152 are connected to actuator cushion members 150 and serve as a connection for circular contact members 154 (FIG. 5) which are conveniently made from TEFLON (Trademark) or a like material to reduce friction force with the movable member 160. Circular contact members 154 are connected to further steel members 152 using flat head bolts (not shown) with the heads of such bolts being recessed slightly so as to be beneath the plane of the exposed surface 154 of circular contact members 154 thereby avoiding contact with the member being moved.

Bellcrank 160 is mounted on shaft 104 and has a distant cylindrical member 161 (FIG. 3) mounted at one end of the bellcrank 160. The actuator 140 is intended to be mounted such that the cylindrical member 161 is located between the circular contact members 154 in light contact with each of the exposed surfaces 153 Conveniently, if the movement of the bellcrank 160 is known, the actuator 140 is designed with the particular rotation of the bellcrank 160 dictating the configuration. For example, the angle of the exposed surfaces 153 may be acute thereby to maintain contact for a longer period with cylindrical member 161 and generally at the central portion of exposed surfaces 153 as seen more clearly in FIG. 5.

Figure 4A:
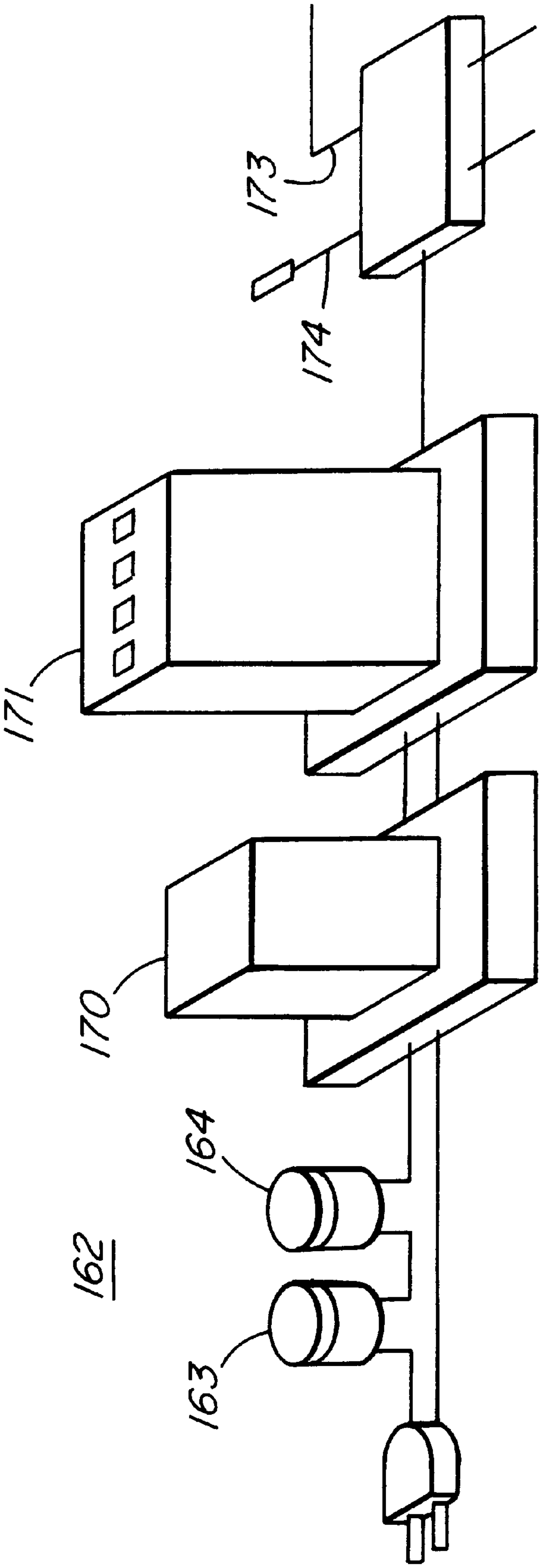
FIG. 4A is a diagrammatic block diagram of a test or control unit utilised to provide initial actuator frequency and cycle length principally during the setup process for actuator adjustment purposes according to a further aspect of the invention.
Figure 4B:
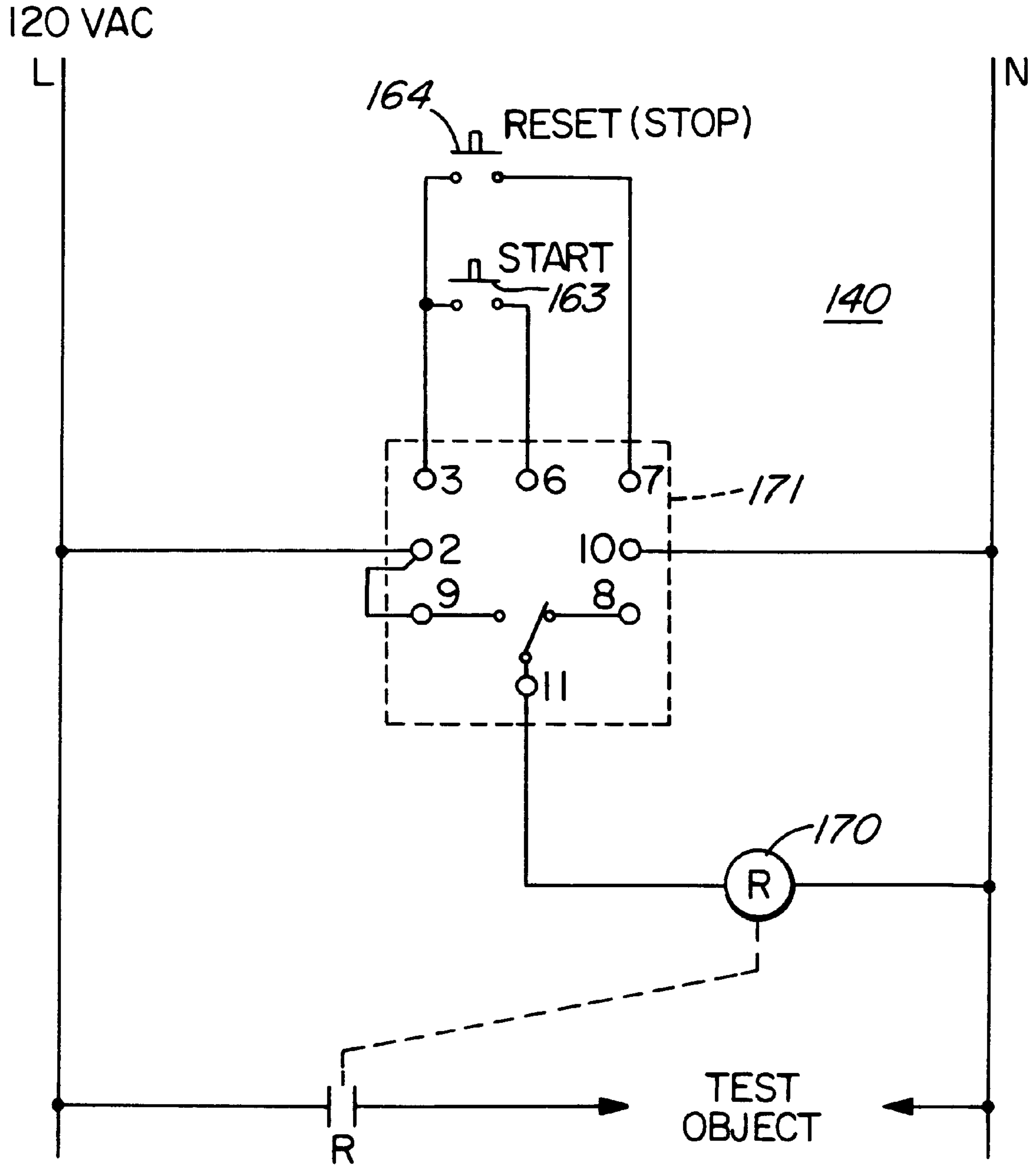
FIG. 4B is a diagrammatic schematic view of the test unit of FIG. 4A.

The control unit used for the installation and setup of the actuator 140 is generally illustrated at 162 in FIG. 4A and a diagrammatic schematic of the control unit 140 is illustrated in FIG. 4B. Control unit 162 comprises two operating on-off switches 163, 164 respectively. A relay 170 is connected between the on-off switches 163, 164 and a timer 171 which is connected to a three way valve 172 which provides air ingress to and air egress from the actuator cushion members 150 by way of air supply lines 151, 152. An air compressor (not shown) provides a source of pressurized air to the three-way valve 172 by way of line 173 and an air exhaust outlet 174 provides for exhaustion of the air from the three-way valve 172 to atmosphere.

Operation

In operation, the actuator 140 will be mounted on the frame 111 of the lug loader 100 according to the requirements of the particular actuating operations. For example, bellcrank 160 will be positioned so as to extend a certain distance from the shaft 104 and the movement of cylindrical member 161 will dictate the radial movement of shaft 104.

Figure 5:
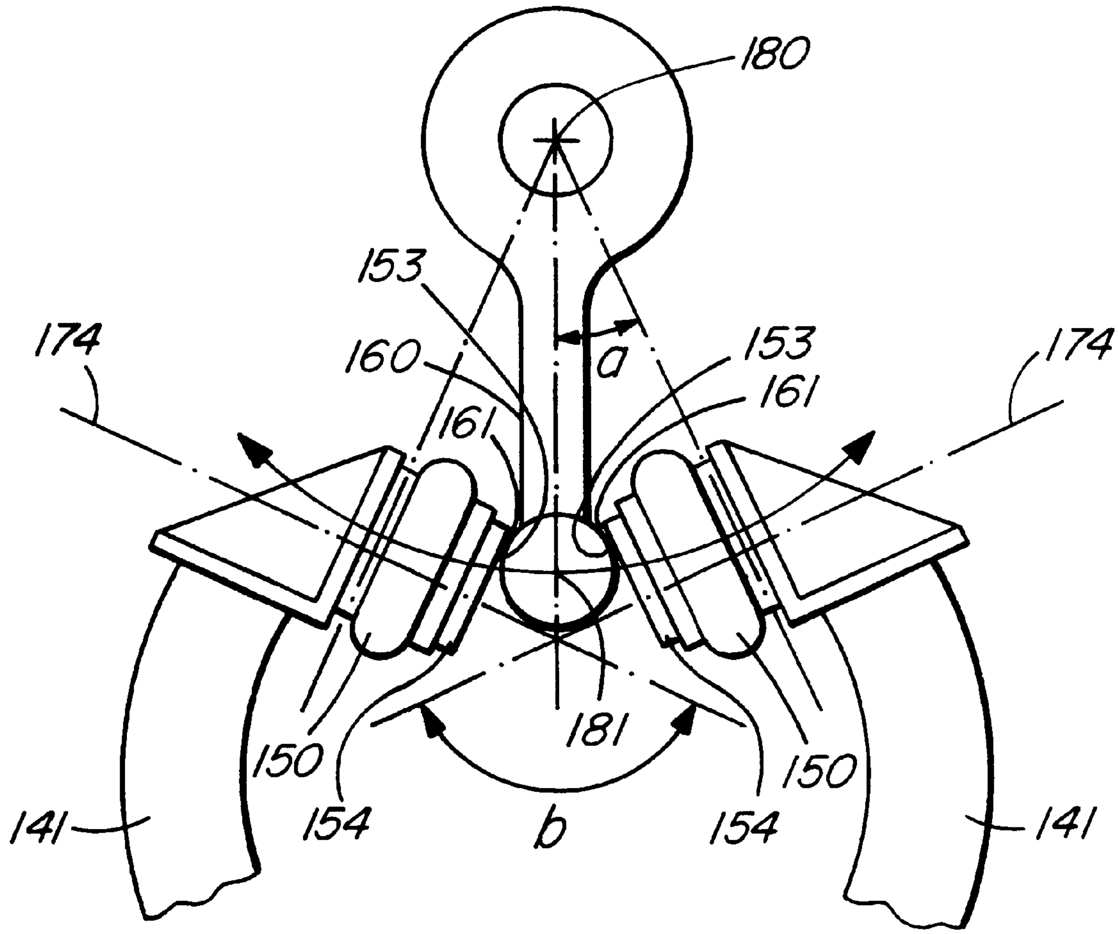
FIG. 5 is a diagrammatic side view of the actuator according to the invention with a bellcrank located between the actuator cushion members particularly illustrating angular relationships between the bellcrank movement and movement of the actuator.

Reference is made to FIG. 5. The angle “a” is known from the desired rotation of shaft 104 in order to give bellcrank 160 or bellcranks 112 their desired and required movement. Cushion members 150 act along axes 174 and the angle “b” between these two axes 174 is selected in order to provide for force on the cylindrical member 161 generally symmetrically on either side of the axes 174 as the bellcrank 160 moves through angle “a”. Clearly the longer the distance between axis of bellcrank 160 and the axis 181 of the cylindrical member 161, the smaller the angle “b” would be. It is emphasized, however, that such angular orientation of frame 141 is not essential but does assist in applying a more even application of force from the expansion and retraction of the cushion members 150 of actuator 140 due to the ingress and egress of air from the air supply.

Following the installation of the actuator 140 and the installation of the bellcrank 160 on the shaft 104, the control unit,140 is used for initial adjustment.

Timer 171 is provided with input instructions as to the duration and frequency of the air application to the actuator 140 so as to move the bellcrank 160 in a desired manner and thereby more efficiently allow the setup of the actuator 140 and bellcrank 160. For example, the timer 171 provides for the time of the cycle of air to commence and end, meaning that air is supplied to the actuator 140 for a predetermined period. The timer 171 can conveniently further provide for the frequency of the cycle; that is, how often the cycle of air is initiated. For the lug loader 100, the cycle frequency will depend on the number of boards 101 which are being conveyed along the table of the lug loader 100 to the board stop 103 and the ability of the lug loader 100 to handle the release of boards 101 from the board stop 103 and board clamp 102. The cycle and frequency times of the control unit 140 are adjustable and can easily be changed by the operator depending on the particular conditions under which the actuator 140 is intended to be operated.

Thereafter, the operation of the air compressor (not illustrated) is initiated and the “on” switch 163 is pressed. Air supply to the valve 172 will commence and the operation of the valve 172 will be in accordance with the cycle and frequency requirements determined by the timer 171. The cushion members 150 will expand on one side of cylindrical member 161 and the cushion members 150 on the opposite side of the cushion member 150 will retract thereby providing a smooth application of force to the cylindrical member 161 and moving bellcrank 160 the required distance in its reciprocal movement.

Reference is also made to FIG. 4B, 120 VAC power will applied across the neutral(“N”) and line(“L”) terminals. Start button 163 is then pushed to commence the “flicker” on-off or timing operation of the actuator 140 which repeatedly changes the state of output pin 11 from OFF to ON and vice versa, with the ON time and OFF time being equal as programmed by the operator. Output pin 11 in turn will operate relay 170 and the contact of relay 170 supplies the power to the actuator 140, in an OFF-ON pattern the same as output pin 11. If the reset button 164 is pressed, the flicker operation is immediately terminated by timer 171 and output pin 11 and relay 170 will return to the OFF state.

At the end of the cycle, the three way valve 172 will reverse the air flow in actuator 140. Air will flow out of cushion member 150 which provided the initial movement force and into opposite cushion member 150 which initially contracted under movement of the bellcrank 160. Thus, an opposed force will be provided to cylindrical member 161 to return the bellcrank 160 to its initial position.

Many modifications will readily occur to those skilled in the art to which the invention relates. For example and with reference to FIG. 1, a further actuator 200 is illustrated by way of a further embodiment of the invention. In this embodiment, the frame 201 is horizontal and the actuator cushion members 202 act in a generally horizontal direction. In this embodiment the cylindrical member 203 may conveniently be located a distance below the axes of movement of the cushion members 202 in the vertical position and, in the fully moved position, the distance of the cylindrical member 203 could be located the same distance above the axes of movement of the cushion member 202. This is not necessary, however, it only being required that the cushion members 202 move an amount that will provide the necessary movement to the cylindrical member 203 and bellcrank 204.

While the actuator 140 has been described as being air actuated, it would be convenient to also use fluid for actuating the actuator cushion members 150. Such fluid would include hydraulic fluid, water or glycol, although any fluid can be used which is conveniently non-caustic and non-petroleum based to avoid deterioration of the material of the actuator cushion members 150 which material is conveniently rubber or elastomer based. The use of fluid is useful in certain conditions where larger forces are required from the cushion members 150 of the actuator 140 and where the actuator cushions 202 are operated in an incremental or step by step movement since air is more easily compressed than fluid.

Likewise, while the member being moved by the actuator 140 is described as a bellcrank 160, the member need not be rotatable about an axis. Rather, the member simply need be one to which the application of force in a cushioned and less forceful impact environment can be beneficial.

Many further modifications will readily occur to those skilled in the art to which the invention relates and the specific embodiments described should be taken as illustrative of the invention only and not as limiting its scope as defined in accordance with the accompanying claims.

I claim:

1. Actuator for initiating movement of a bellcrank, said actuator comprising a frame and at least one flexible and expandable actuator cushion member mounted on one side of said frame and being operable to move said bellcrank.

2. Actuator as in claim 1 wherein one of said flexible and expandable actuator cushion members is mounted on each side of said bellcrank, each of said expandable actuator cushion members being operable to move said bellcrank.

3. Actuator as in claim 2 wherein air is provided to said actuator cushion members to expand said cushion members.

4. Actuator as in claim 2 wherein hydraulic fluid is provided to said actuator cushion members to expand said cushion members.

5. Actuator as in claim 2 wherein water is provided to each of said actuator cushion members to expand said cushion members.

6. Actuator as in claim 2 wherein glycol is provided to said actuator cushion members to expand said cushion members.

7. Actuator as in claim 2 and further including a control unit to initiate and terminate the flow of air into said actuator cushion members.

8. Actuator as in claim 7 wherein said control unit further controls the entry of air into and the exit of air from said actuator cushion members.

9. Actuator as in claim 8 wherein said cushion members each have a longitudinal axis in the direction of movement of said actuator cushion members, said axes intersecting at a predetermined angle.

10. Actuator as in claim 2 and further comprising a contact member connected to said actuator cushion members, said contact member contacting said movable member.

11. Control unit for an actuator, said control unit having a first component to adjust the frequency of movement of a cushion member in operable contact with a bellcrank and a second component to adjust the cycle length of said movement of said bellcrank by said cushion member.

12. Control unit as in claim 11 wherein said actuator is pneumatically actuated.

13. Control unit as in claim 11 wherein said actuator is hydraulically actuated.

14. Control unit as in claim 11 wherein said actuator is water actuated.

15. Method of initiating movement of a movable member comprising locating an actuator cushion member in operable relationship with said member and expanding and contracting said actuator cushion member to move said movable member while allowing sliding movement of said movable member relative to said cushion member at an interface between said cushion member and said movable member during said movement, said actuator cushion member moving said movable member through said expansion and contraction at predetermined time intervals.

16. Method as in claim 15 wherein air is supplied to said actuator cushion member for said expansion.

17. Method as in claim 15 wherein fluid is supplied to said actuator cushion member for said expansion.

18. Method as in claim 17 wherein said fluid is water or glycol.

19. Method as in claim 17 wherein said fluid is a non-petroleum based fluid.

20. Method as in claim 17 wherein said fluid is a non-caustic fluid.

21. Method of controlling an actuator comprising adjusting the frequency of operation of a cushion member in operable contact with a movable member with a first component and adjusting the length of the cycle of said operation of said cushion member with a second component.

22. Method as in claim 21 wherein said first and second components are a timer.

23. Actuator for initiating movement of a movable member mounted remotely from said actuator, said actuator comprising a frame and at least one flexible and expandable actuator cushion member mounted on one side of said frame, said cushion member including a contact element between said cushion member and said movable member, said cushion member being operable to move said movable member by operable contact between said contact element and said movable member, said movable member moving relative to said contact element during said movement.

* * * * *